Figure 1:
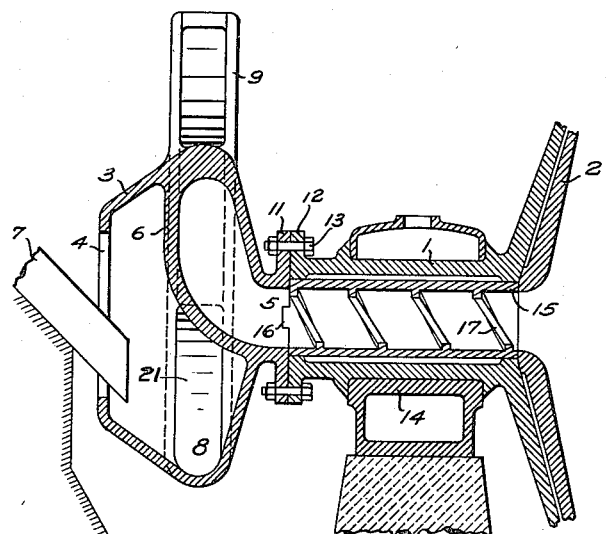

R. C. GREENFIELD.
FEEDER.
APPLICATION FILED JAN. 31, 1916.

1,214,776.

Patented Feb. 6, 1917.

Inventor
R. C. Greenfield by

Attorney

UNITED STATES PATENT OFFICE.

ROY C. GREENFIELD, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

FEEDER.

1,214,776.  Specification of Letters Patent.  Patented Feb. 6, 1917.

Application filed January 31, 1916. Serial No. 75,366.

*To all whom it may concern:*

Be it known that I, ROY C. GREENFIELD, a citizen of the United States, residing at Milwaukee, in the county of Milwaukee and State of Wisconsin, has invented a certain new and useful Improvement in Feeders, of which the following is a specification.

This invention relates to improvements in the construction of feeders and is especially applicable to rotary devices for feeding material into rotating machines, such as tube or ball mills, revolving screens, and the like.

An object of the invention is to provide a feeder which is simple in construction and efficient in operation.

One of the more specific objects is to provide a rotary feeder which will automatically feed several kinds of material through a common discharge opening.

Another object is to provide a feeder which will automatically elevate material from at least two different elevations and deliver the same through a common discharge opening.

A further object is to provide a feeder which may be bodily attached directly to the trunnion of a rotating machine so that the feeder is automatically actuated by the rotation of the machine.

It has heretofore been proposed to provide a feeder adapted for attachment to the outer end of the trunnion of a rotating mill, comprising a circular casing of a diameter somewhat larger than that of the trunnion, the casing having a feed inlet opening on the side thereof remote from the trunnion and a discharge opening on the side thereof adjacent the trunnion, the material being admitted to the casing through the feed inlet opening and discharged from the casing by means of an elevating device adapted to automatically feed the material from the peripheral portion of the casing through the discharge opening during rotation of the mill. In these prior devices all of the material delivered to the feeder was admitted through a single opening, so that if it was desired to feed material from two or more places at different elevations, it was necessary to elevate all of the material to a common point before delivery to the feeder. In order to avoid necessity of thus preliminarily elevating some or all of the material, the present invention contemplates the provision of a feeder which will automatically receive material from different levels and elevate the same to a common point of discharge.

A clear conception of an embodiment of the invention may be had by referring to the drawing accompanying and forming a part of this specification in which like reference characters designate the same or similar parts in the various views.

Figure 2:
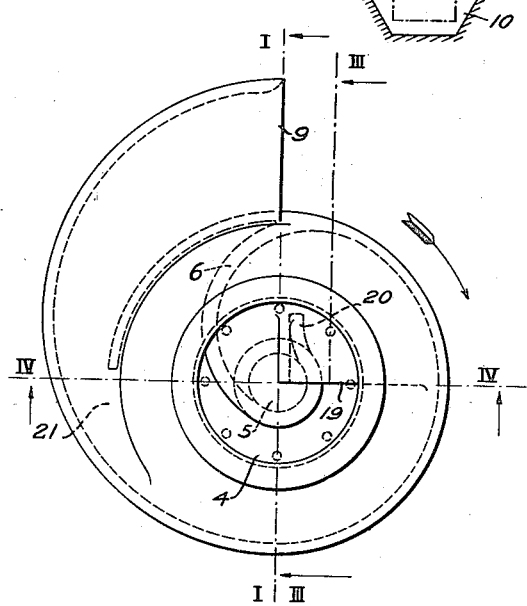
Figure 4:
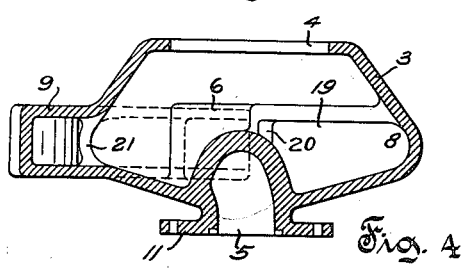
Figure 3:
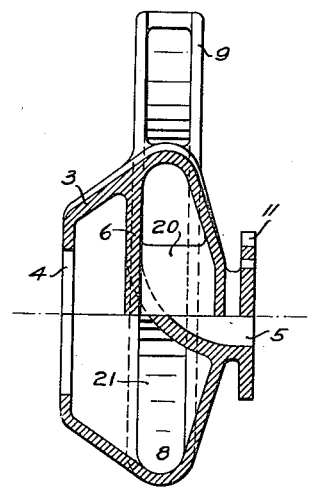

Figure 1 is a transverse vertical section through a feeder, showing the same applied to the hollow trunnion of a rotary machine and associated elements, the section being taken along the line I—I of Fig. 2 looking in the direction of the arrows. Fig. 2 is an end view of the feeder disclosed in Fig. 1, looking toward the rotary machine. Fig. 3 is a transverse vertical section through the feeder, the section being taken along the line III—III of Fig. 2 looking in the direction of the arrows. Fig. 4 is a transverse section through the feeder, the section being taken along the line IV—IV of Fig. 2 looking in the direction of the arrows.

The feeder comprises essentially an annular casing 3 having an axial inlet opening 4 on one side thereof, and having an axial discharge opening 5 on the opposite side thereof. The side of the casing 3 adjacent the discharge opening 5 is provided with a flange 11 by means of which the feeder casing 3 is secured to an adjacent flange 12 located at the outer extremity of the hollow trunnion 1. The bolts 13 serve to detachably connect the flanges 11, 12. The hollow trunnion 1 is preferably part of a rotary machine 2 which may be either a tube or ball mill, a revolving screen, or similar device rotated in the usual manner. The trunnion 1 is supported in a bearing 14 in the usual manner and is provided on its interior with a liner 15 forming a conduit and having projecting lugs 16 at the inlet end thereof. The projections 16 engage similarly formed recesses in the end of the casing 3, thus forming a positive driving connection between these elements. The liner 15 is provided with helical ribs 17 which during rotation of the mill serve to automatically feed material admitted to the interior of the liner toward the machine 2.

The interior of the casing 3 is provided with an elevating device comprising a spiral scoop 6 which extends from the periphery 8 of the casing 3 to the discharge opening 5 thereof. The inlet opening 19 of the spiral scoop 6 communicates directly with the interior of the casing 3. A wall 20 formed within the scoop 6 serves to direct the material passing along the spiral scoop 6 toward the discharge opening 5 and prevents material from falling back into the casing 3 over the inner end of the scoop. The periphery of the casing 3 is provided with a second inlet opening 21, which forms a direct communication between the interior of the casing 3 and the interior of the outer spiral scoop 9. The scoop 9 is preferably secured directly to or formed integral with the periphery of the casing 3 and together with the scoop 6 forms a continuous spiral terminating at the discharge opening 5. The scoop 9 is adapted to pick up and elevate material delivered into the stationary trough 10 located at a point considerably below the axis of the trunnion 1. The inner scoop 6 receives a partial supply of material from the trough 10 and in addition receives other material from the feed chute 7 through the inlet opening 4.

During the normal operation of the feeder, the machine 2 is rotated in the usual manner causing the trunnion 1 and feeder casing 3 to rotate in a clockwise direction as viewed in Fig. 2. The coarse material which in the case of a ball mill comprises the raw material together with the new grinding balls, is fed through the feed spout 7 to the interior of the casing 3 through the axial inlet opening 4. The relatively fine material which in the case of ore milling usually comprises the oversize from a classifier or similar device, is deposited in the trough 10, and charges thereof are intermittently picked up by the scoop 9 and elevated, being eventually delivered into the casing 3 through the peripheral inlet opening 21. The combined charges thus admitted to the casing 3 through the openings 4, 21, are during rotation of the feeder picked up and elevated by the inner scoop 6. As the scoop 6 approaches its uppermost position, the material resting on the spiral wall thereof gradually cascades downwardly toward the discharge opening 5. The cascading material is delivered by gravity through the discharge opening 5 into the interior of the hollow trunnion 1. The material thus admitted to the hollow trunnion 1 is automatically conveyed through the trunnion liner 15 and delivered into the machine 2 by means of the helical liner ribs 17.

It will thus be seen that the feeder receives material from the trough 10 which is considerably below the axis of the trunnion 1 and from the chute 7 which delivers other material into the feeder at a place intermediate the trough 10 and the axis of the trunnion, and auomatically elevates and discharges all of the material received into the liner 15. The material received at the different points may be of like nature or different. If all of the material which it is desired to feed, is at the level of the trough 10, the scoop 9 may alone be utilized to supply the feeder, thereby avoiding necessity of preliminarily elevating any material with special elevating devices not forming part of the feeder. By detachably connecting the feeder to the outer end of the trunnion 1, access for inspection is readily permitted and operation of the feeder is effected by the operation of the mill.

It should be understood that it is not desired to be limited to the exact details of construction shown and described, for obvious modifications will occur to a person skilled in the art.

It is claimed and desired to secure by Letters Patent,—

1. In combination, means forming a conduit rotatable about an axis, said conduit having ends one remote from and another adjacent to said axis, means for feeding material requiring reduction into said end of said conduit remote from said axis, means for delivering material from said end of said conduit adjacent to said axis, and means for feeding other material into said conduit at a point intermediate said ends.

2. A feeder comprising a spiral rotatable about an axis and extending around and gradually approaching said axis, the end of said spiral which is farther from said axis being formed to receive material and the end which is nearer said axis being formed to discharge said material, said feeder having an opening adjacent said axis and having a passage, said passage leading from said opening to said spiral at a point intermediate its ends.

3. In combination, means forming a conduit rotatable about an axis, said conduit having ends one remote from and another adjacent to said axis, means for feeding material into said end of said conduit remote from said axis, means for delivering material at one side of said conduit from said end of said conduit adjacent to said axis, and means for feeding other material into said conduit from the opposite side thereof at a point intermediate said ends.

4. In combination, a hollow trunnion, a casing adjacent an end of said trunnion, means for feeding material into said casing through the side thereof axially remote from said trunnion, a spiral scoop for feeding other material into said casing through the periphery thereof, and means for delivering the material from said casing into said trunnion.

5. In combination, a casing rotatable about an axis, said casing being formed with openings adjacent its axis and with an opening through a portion thereof remote from said axis, means for feeding material into said casing through one of said axial openings, an outer spiral scoop for feeding other material into said casing through said opening remote from said axis, and an inner spiral scoop for delivering the material from said casing through another of said axial openings.

6. In combination, an annular casing rotatable about its axis of annularity, said casing being formed with opposite axial openings, and with a peripheral opening, means for feeding material into said casing through one of said axial openings, an outer spiral scoop for feeding other material into said casing through said peripheral opening, and an inner spiral scoop for delivering the material from said casing through the other of said axial openings.

7. A feeder comprising conducting means rotatable about an axis and having ends respectively located at different distances from said axis, the end of said conducting means which is farther from said axis being formed to receive material and the end which is nearer said axis being formed to discharge said material, said conducting means having an opening concentric with said axis to receive other material intermediate its ends.

8. A feeder comprising a casing having openings on its opposite sides and in its peripheral wall, and an outer spiral scoop connected with said casing between its sides and leading into said peripheral opening, said casing also having an inner spiral scoop leading from one of its side openings and from said peripheral opening to the other of said side openings.

In testimony whereof, the signature of the inventor is affixed hereto.

ROY C. GREENFIELD.